(12) United States Patent
Taylor et al.

(10) Patent No.: US 12,530,644 B2
(45) Date of Patent: *Jan. 20, 2026

(54) SYSTEM AND METHOD FOR DYNAMIC PERISHABLE ITEM REPLENISHMENT

(71) Applicant: Walmart Apollo, LLC, Bentonville, AR (US)

(72) Inventors: Robert James Taylor, Rogers, AR (US); Leigh Ann Marie Scobey, Bentonville, AR (US); Matthew D. Alexander, Rogers, AR (US); Jeffrey Scott Cruz, Bentonville, AR (US); Lacrecia Lynn Billings, Rogers, AR (US); Joseph Wayne Hendricks, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,625

(22) Filed: May 1, 2023

(65) Prior Publication Data
US 2023/0267393 A1    Aug. 24, 2023

Related U.S. Application Data (63) Continuation of application No. 16/353,270, filed on Mar. 14, 2019, now Pat. No. 11,676,084.
(Continued)

(51) Int. Cl.
*G06Q 10/0631* (2023.01)
*B65G 1/137* (2006.01)
(Continued)

(52) U.S. Cl.
CPC ..... *G06Q 10/06315* (2013.01); *B65G 1/1373* (2013.01); *G06K 19/06* (2013.01); *G06Q 10/087* (2013.01); *G06K 2019/06253* (2013.01)

(58) Field of Classification Search
None
See application file for complete search history.

(56) References Cited

U.S. PATENT DOCUMENTS

| 4,862,160 A | 8/1989 | Ekchian |
| 7,894,932 B2 * | 2/2011 | Mountz ............... G06Q 10/087 700/214 |

(Continued)

FOREIGN PATENT DOCUMENTS

WO    2019178332    9/2019

OTHER PUBLICATIONS

Baron, Opher. "Managing perishable inventory." Wiley encyclopedia of operations research and management science (2010) (Year: 2010).*

(Continued)

*Primary Examiner* — Darlene Garcia-Guerra
(74) *Attorney, Agent, or Firm* — Fitch, Even, Tabin & Flannery LLP (57) ABSTRACT

System and methods for dynamic replenishment in a facility are disclosed. A mobile inventory processing device reads a machine readable tag affixed to a perishable item and transmits an indication of the perishable item to a stock inventory processing device. The stock inventory processing device retrieves a stock inventory value corresponding to the perishable item and a historic daily sales value for the perishable item from a database. The stock inventory processing device determines a restocking value based on whether the historic daily sales value exceeds the stock (Continued)

inventory value. The stock inventory processing device transmits a second indication to the mobile inventory processing device, The second indication correspond to insufficient shelf stock of the perishable item. The mobile inventory processing device receives the second indication and outputs an auditory alert in response to the second indication.

17 Claims, 4 Drawing Sheets

Related U.S. Application Data (60) Provisional application No. 62/643,448, filed on Mar. 15, 2018.

(51) Int. Cl.
*G06K 19/06* (2006.01)
*G06Q 10/087* (2023.01)

(56) References Cited

U.S. PATENT DOCUMENTS

| | | | |
|---|---|---|---|
| 8,325,036 B1 | 12/2012 | Fuhr | |
| 10,239,738 B2 | 3/2019 | High | |
| 10,318,569 B1 | 6/2019 | Funk | |
| 2001/0007982 A1* | 7/2001 | Brown | G06Q 10/087 705/28 |
| 2001/0056482 A1* | 12/2001 | Lewis | G16H 20/10 709/224 |
| 2003/0216969 A1* | 11/2003 | Bauer | G06K 17/00 705/22 |
| 2005/0149414 A1 | 7/2005 | Schrodt | |
| 2006/0031148 A1* | 2/2006 | O'Dell | G06K 17/0022 705/28 |
| 2007/0203809 A1* | 8/2007 | Bapat | G06Q 10/087 705/28 |
| 2007/0208598 A1 | 9/2007 | Mcgrady | |
| 2008/0133317 A1 | 6/2008 | Benson | |
| 2008/0294500 A1* | 11/2008 | Koether | G06Q 30/0202 705/7.29 |
| 2010/0049616 A1 | 2/2010 | Hipsher | |
| 2010/0134257 A1* | 6/2010 | Puleston | G06K 7/0008 340/10.4 |
| 2011/0018685 A1 | 1/2011 | Tanaka | |
| 2013/0275236 A1* | 10/2013 | Koke | G06Q 30/0212 705/15 |
| 2014/0201042 A1 | 7/2014 | Meyer | |
| 2014/0249944 A1 | 9/2014 | Hicks | |
| 2014/0258051 A1 | 9/2014 | Bostwick | |
| 2014/0279294 A1* | 9/2014 | Field-Darragh | H04B 5/77 705/28 |
| 2015/0073925 A1 | 3/2015 | Renfroe | |
| 2015/0178671 A1 | 6/2015 | Jones | |
| 2016/0217447 A1 | 7/2016 | Sarkar | |
| 2016/0260161 A1* | 9/2016 | Atchley | G06Q 50/40 |
| 2016/0350787 A1* | 12/2016 | Taylor | G06Q 10/087 |
| 2017/0124613 A1 | 5/2017 | Beyagudem | |
| 2017/0140317 A1* | 5/2017 | Vann | G06Q 10/06315 |
| 2017/0228755 A1 | 8/2017 | Tkachenko | |
| 2018/0060943 A1 | 3/2018 | Mattingly | |
| 2018/0158009 A1* | 6/2018 | Moon | G06Q 10/06315 |
| 2018/0189725 A1 | 7/2018 | Mattingly | |
| 2018/0204172 A1* | 7/2018 | Sabuz | G06Q 10/0835 |
| 2018/0225625 A1 | 8/2018 | Difatta | |
| 2019/0012721 A1 | 1/2019 | Fujita | |
| 2019/0035043 A1* | 1/2019 | Jones | G01P 15/0891 |
| 2019/0272557 A1 | 9/2019 | Smith | |
| 2020/0034790 A1* | 1/2020 | Millhouse | G06Q 10/06313 |
| 2020/0364381 A1* | 11/2020 | Wodrich | G01S 19/48 |

OTHER PUBLICATIONS

Herbon, Avi, Eugene Levner, and T. C. E. Cheng. "Perishable inventory management with dynamic pricing using time-temperature indicators linked to automatic detecting devices." International Journal of Production Economics 147 (2014): 605-613 (Year: 2014).*

Bertolini, Massimo, et al. "Reducing out of stock, shrinkage and overstock through RFID in the fresh food supply chain: Evidence from an Italian retail pilot." International Journal of RF Technologies 4.2 (2013): 107-125 (Year: 2013).*

Chande, A., et al. Perishable inventory management and dynamic pricing using RFID technology. Sadhana 30.2-3 (2005): 445-462 (Year: 2005).

International Search Report and Written Opinion from related International Patent Application No. PCT/US2019/022214 issued May 29, 2019.

Kipkulei, Kenneth. Effects of information technology on reducing perishable waste in supermarkets. Diss. Walden University, 2013. (Year: 2013).

PCT; App. No. PCT/US2019/022214; International Preliminary Report on Patentability mailed Sep. 15, 2020.

USPTO; U.S. Appl. No. 16/353,270; Final Rejection mailed Dec. 28, 2021; (pp. 1-42).

USPTO; U.S. Appl. No. 16/353,270; Office Action mailed Jan. 6, 2021.

USPTO; U.S. Appl. No. 16/353,270; Office Action mailed Jun. 16, 2021; (pp. 1-51).

USPTO; U.S. Appl. No. 16/353,270; Office Action mailed Aug. 10, 2020.

USPTO; U.S. Appl. No. 16/353,270; Non-Final Rejection mailed Sep. 27, 2022; (pp. 1-29).

USPTO; U.S. Appl. No. 16/353,270; Notice of Allowance and Fees Due (PTOL-85) mailed Feb. 1, 2023; (pp. 1-22).

Vanderroost, Mike, et al. "Intelligent food packaging: The next generation." Trends in food science & technology 39.1 (2014): 47-62 (Year: 2014).

Wang, Xiaojun, and Dong Li. "A dynamic product quality evaluation based pricing model for perishable food supply chains." Omega 40.6 (2012): 906-917 (Year: 2012).

* cited by examiner

SYSTEM AND METHOD FOR DYNAMIC PERISHABLE ITEM REPLENISHMENT

RELATED APPLICATIONS

This application is a continuation of U.S. application Ser. No. 16/353,270, filed Mar. 14, 2019, now U.S. Pat. No. 11,676,084, which claims priority to and the benefit of U.S. Provisional Application No. 62/643,448, filed Mar. 15, 2018, which are incorporated herein by reference in their entirety.

BACKGROUND

Supply chain systems facilitate the movement of perishable items to a store. Determinations as to when to move the perishable items from supply rooms to shelf stock is often inconsistent.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is a system for dynamic perishable item replenishment in a retail facility. The system reads machine readable tags associated with perishable items that have been delivered to the facility. The system transmits first indications of the perishable items to a stock inventory processing device. The stock inventory processing device retrieves stock inventory values corresponding to the perishable items. A historic daily sales value for each perishable item can be retrieved from a database. The stock inventory processing device determines a restocking value based on whether the historic daily sales value exceeds the stock inventory value for each item. The stock inventory processing device transmits second indications to one or more mobile inventory processing devices. The second indications can correspond to insufficient shelf stock of one or more perishable items. The second indications can cause the mobile inventory processing devices to generate an audible indication.

Figure 1:
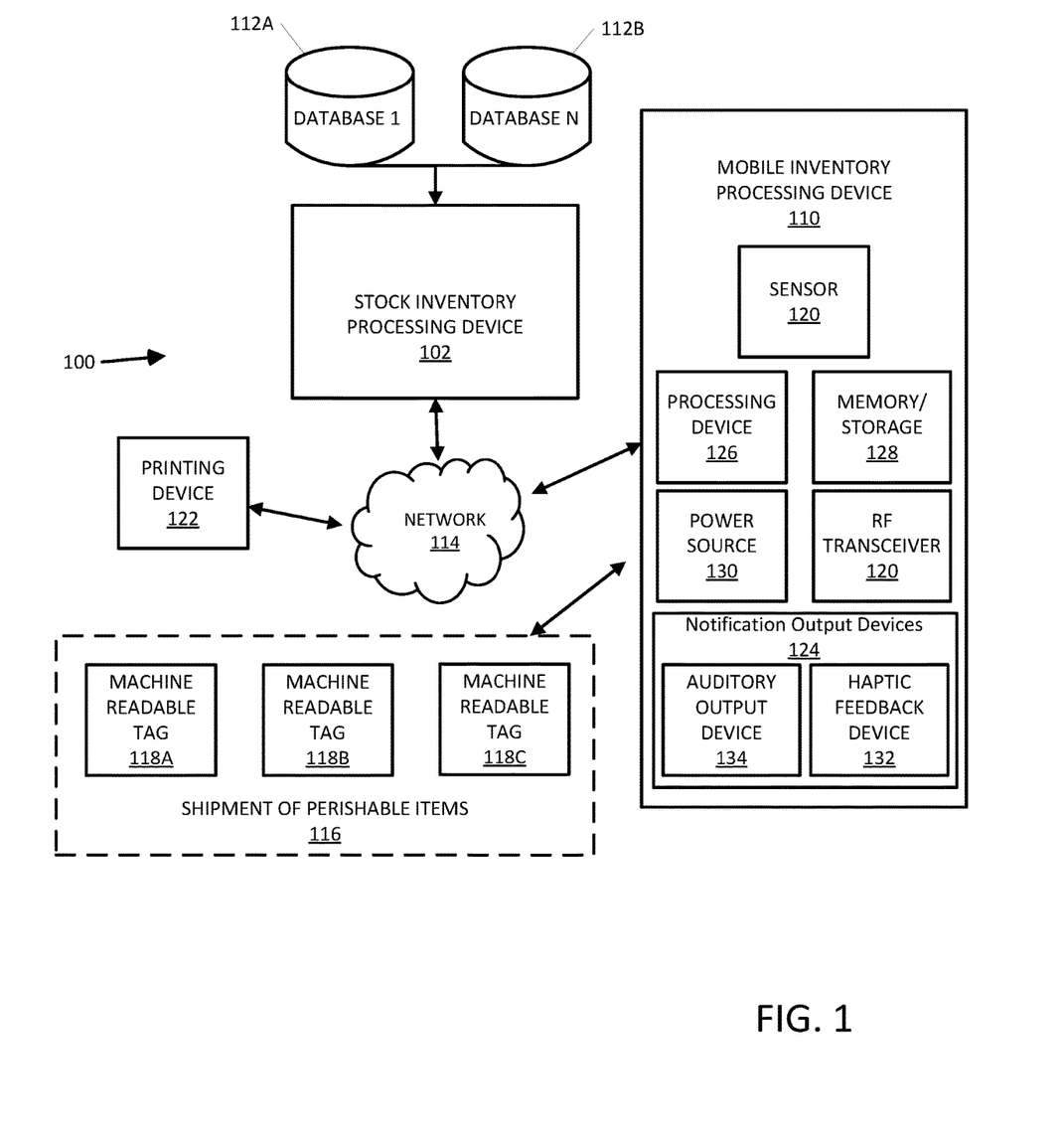
FIG. 1 is a block diagram illustrating a system for dynamic perishable item replenishment in a retail facility according to an exemplary embodiment.

FIG. 1 is a block diagram illustrating a system for dynamic perishable item replenishment in a retail facility according to an exemplary embodiment. The system includes a shipment of perishable items 116, one or more machine readable tags 118A,118B,118C attached to or otherwise associated with the perishable items in the shipment. The system also includes a user-facing mobile inventory processing device 110 which has an included sensor 120. Network 114 infrastructure connects the mobile inventory processing device 110 and the stock inventory processing device 102. The stock inventory processing device 102 can selectively interface with one or more databases 112A, 112B.

A retail environment can receive many shipments of perishable items 116 in any day. Shipments can vary in size. Perishable items can include food items with a short shelf life which will spoil and become either unfit for sale or unfit for consumption. Examples of perishable items include but are not limited to produce, meats, dairy, produce, and bakery goods. The perishable items can be independently packaged or bulk packaged.

Machine readable tags 118A, 118B, 118C can be affixed to or otherwise associated with the packaging of the perishable items. The machine readable tags 118A, 118B, 118C can include but are not limited to machine readable bar codes or quick response (QR) codes. Additionally, the machine readable tags can include radio frequency (RF) implementations such as near field communications (NFC) and Bluetooth low energy (LE) tags. One non-limiting example of a RF implementation can be an RFID tag. The machine readable tags 118A, 118B, 118C are unique to their associated perishable items. The machine readable tags 118A, 118B, 118C are encoded with information identifying the perishable items stored in the databases 112A, 112B. For example, a bar code and QR code can be encoded with numeric information identifying the perishable item to which the barcode or QR code is attached. The databases 112A, 112B can contain entries indexed based on the encoded numeric information corresponding to the perishable items to which they are attached. In the radio frequency tag embodiment, the machine readable tags 118A, 118B, 118C may include additional information corresponding to the shipment of perishable items 116 including, but not limited to, historical location information of the shipment of perishable items 116 that may affect a manner in which the perishable items are processed.

The mobile inventory processing device 110 can be a handheld user device. The mobile inventory processing device 110 can include a mobile device with at least one sensor 120. The mobile inventory processing device 110 can be a smartphone, tablet, subnotebook, laptop, personal digital assistant (PDA), handheld device, such as a Symbol® MC18 or MC40, and/or any other suitable mobile device that can be programmed and/or configured to implement and/or interact with embodiments of the system via wireless communication. For example, the mobile device 110 can be a Symbol® MC18. The MC18 can be a handheld mobile computer configured to execute the Android and/or Windows operating system. The MC18 can include 1D and 2D scanner, Wi-Fi (802.11a/b/g/n), a camera, a display, Android 2.3 and/or Windows 7, 1 GB RAM/8 GB flash, and a battery. The mobile inventory processing device 110 can include a processing device 126, such as a digital signal processor (DSP) or microprocessor, memory/storage 128 in the form a non-transitory computer-readable medium, a power source 130, and a radio frequency transceiver 132. The sensor 120 can include an optical reading device operable to read a bar code such as a universal product code (UPC) label. Additionally, the sensor 120 can be configured to read QR codes utilizing the network connection provided by the network 114 and the network's underlying infrastructure. The sensor 120 can also be configured to respond to Bluetooth LE beacons or tags. Additionally, the mobile inventory processing device 110 can include one or more notification output devices 124. In some embodiments, the notification output device(s) 124 can include, for example, an auditory output device 134, such as a speaker or headphone connection. The speaker or headphone connection (with accompanying headphones) can provide the user with auditory alerts and messages during inventory activities. Additionally, or in the alternative, the notification output device(s) 124 can include a haptic feedback device 132 which can provide the user of the mobile inventory processing device 110 notifications in environments where auditory alerts are inappropriate or difficult to discern. The mobile inventory processing device 110 can include a display. The display on the mobile inventory processing device 110 can visually provide indications and information to the user relating to inventory status and locations of perishable items in need of stocking or moving.

The mobile inventory processing device 110 can communicate to the stock inventory processing device 102 through the network 114. The network 114 can be a wide area network (WAN) or the Internet. The network 114 can be operable to transport data packets compatible with mobile inventory processing device 110 and the stock inventory processing device 102. In one embodiment, compatible data packets can include data packets with transmission control protocol (TCP) or user datagram protocol (UDP) routing information, as well as an accessible application layer. The network 114 can interface with other networks or servers. The network 114 can be a combination of wired and wireless connection inclusively.

The stock inventory processing device 102 provides the central data processing required for dynamic perishable item replenishment. The stock inventory processing device 102 can be communicatively coupled to one or more mobile inventory processing devices 110 through the network 114. The stock inventory processing device 102 can be a physical dedicated computing device for inventory processing, or, alternatively, a virtualized computing device for inventory processing. In the virtualized embodiment, the stock inventory processing device 102 can be a virtualized instance running in a shared computing environment. Alternatively, or in addition, the stock inventory processing device 102 can be virtualized functions executing across multiple physical hosts. The stock inventory processing device 102 can contain logic to determine stock inventory levels, historic daily sales volumes, sales of items through point of sale terminals, and locations of stock throughout at retail facility.

Databases 112A, 112B catalog and index stock inventories. The databases 112A, 112B can be locally attached storage or area attached storage. The databases 112A, 112B can contain inventory related metrics including current shelf stock, back room stock, as well as historical information utilized to identify historic daily sales volumes and values.

A printing device 122 can be communicatively attached to the network 114. The printing device 122 can be utilized in conjunction with the stock inventory processing device 102 and the mobile inventory processing device 110 for stock or backroom management. The printing device 122 can received instructions from the stock inventory processing device 102 to print labels corresponding to the inventorying of the received shipment of perishable items 116 when items in the shipment are not needed for shelf stock. The printing device 122 can utilize the instructions to print a label to be affixed to a bin to contain the identified perishable items of the shipment that are not needed for shelf stock in the backroom. Additionally, the printing device 122 can be utilized to print a shelving label for perishable items that are being transferred from the shipment or the backroom to the sales floor.

Figure 2:
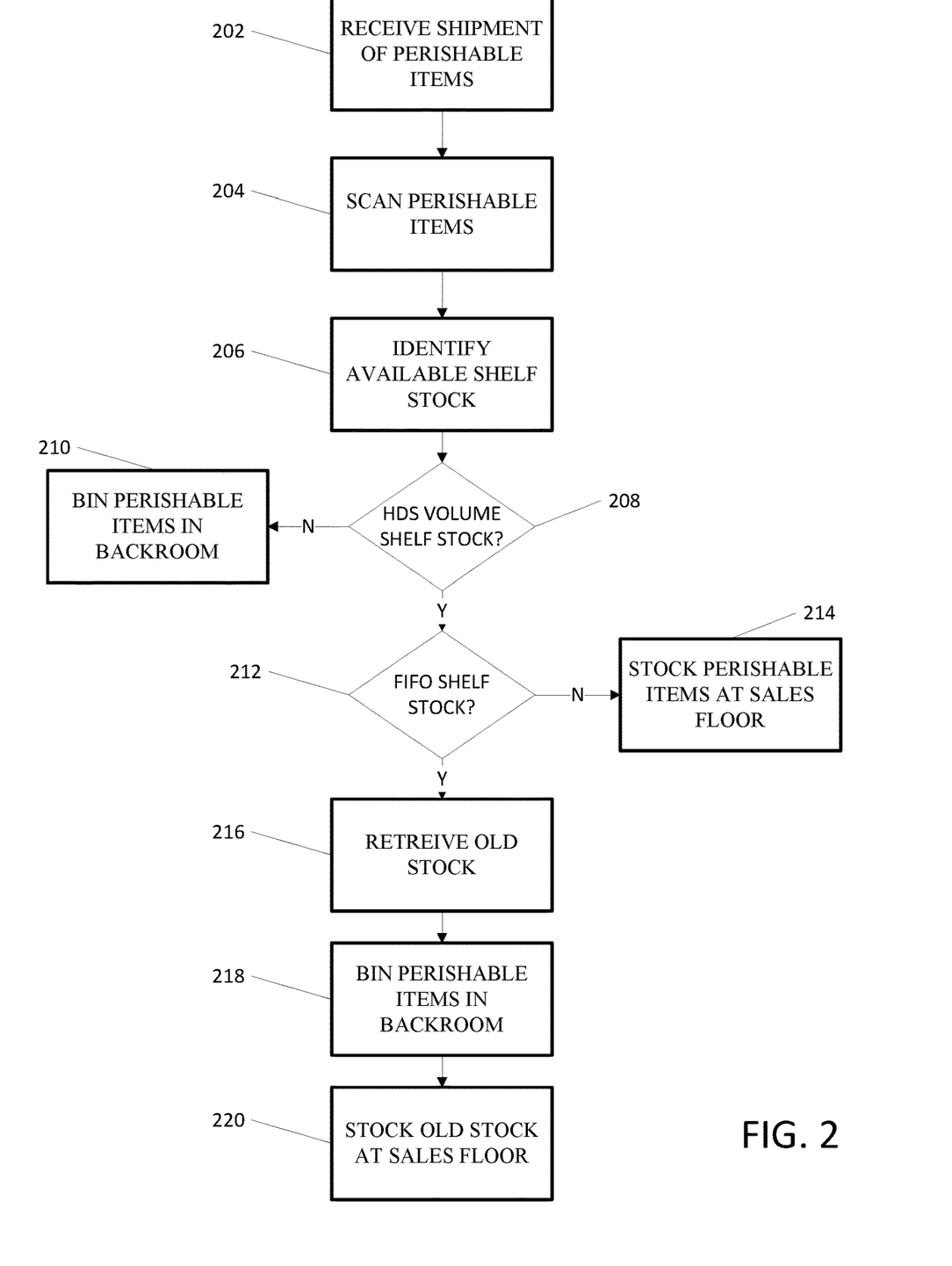
FIG. 2 is a flow diagram illustrating a process for dynamic perishable item replenishment in a retail facility according to an exemplary embodiment.

FIG. 2 is a flow diagram illustrating a process for dynamic perishable item replenishment in a retail facility according to an exemplary embodiment.

At step 202, a retail facility receives a shipment of perishable items. Perishable items can be received periodically throughout a day. The shipment of perishable items can be unloaded from a delivery truck and brought to a receiving area of the facility for processing. Perishable items received in a shipment can be homogenous or heterogeneous based on their type. For example, a shipment including perishable items such as carrots and lettuce would be heterogeneous and a shipment including perishable items only of celery would be homogenous.

At step 204, the perishable items in the shipment are scanned. For example, machine readable tags on the packaging of the perishable items can be read by a mobile inventory processing device. The mobile inventory processing device utilizes a sensor to read the machine readable tag. The sensor can take the form of an appropriate sensor based on the type of machine readable tag. Upon the scanning of each machine readable tag, the mobile inventory processing device encodes the information present in each tag, and transmits that encoded information across a network 114 to the stock inventory processing device.

At step 206, the stock inventory processing device identifies available shelf stock of the identified received perishable items. The stock processing device queries one or more databases 112A, 112B for available stock in the retail facility. Available shelf stock can include stock marketed at the traditional location within the retail environment, as well as stock marketed in promotional areas. The available shelf stock can be updated in real time as purchases of the perishable items are communicated to the stock inventory processing device by one or more point of sale terminals. As the stock is sold, the current shelf stock entries in the databases 112A, 112B are correspondingly updated to reflect an accurate accounting of the shelf stock in a retail facility.

At step 208, the stock inventory processing device evaluates whether a historical daily sales volume exceed the current shelf stock. Historic aggregation of sales across time periods are stored in the one or more databases 112A, 112B. Periodically, the stock inventory processing device aggregates sales for different time periods and recalculates a historic daily sales volume. For example, the databases 112A, 112B can keep a historic daily sales volume for each day of the week, specific holidays, as well as weeks prior to holidays. The stock inventory processing device can periodically recalculate these historic daily sales as to keep them accurate with recent sales. The stock inventory processing device compares the current shelf stock availability with the historic daily sales volume for that period. If the historic daily sales volume is greater than the shelf stock availability, the system can identify an anticipated shelf stock deficiency. Historic daily sales can factor in data related to regional sales and store demographics.

At step 210, upon the stock inventory processing device determining that the historic daily sales volume does not exceed current shelf stock for a scanned item, the system determines that the scanned perishable item in the shipment should be stored/binned in the backroom or staging area. The stock inventory processing device can encode an indication to bin the perishable item in the shipment. The indication can be transmitted through the network to the mobile inventory processing device, where the indication can be translated into an auditory output and/or display information. Alternatively, or in addition, the stock inventory processing device can transmit an indication to the printing device 122 to print a label for the storage of the scanned perishable item in the shipment. The printing device 122 can print a label to be affixed to a bin which can contain the scanned perishable item for storage. The label can include a machine readable tag that the sensor 120 on the mobile inventory processing device 110 can read. After the label is affixed to the bin, the label can be utilized in the same manner as the machine readable tags 118A, 118B, 118C for the dynamic replenishment of perishable items.

At step 212, the stock inventory processing device then determines if additional stock should be processed first in, first out (FIFO) when the historic daily sales volume exceeds current shelf stock. The stock inventory processing device queries the one or more databases 112A, 112B to determine if there is stock already available in the retail facility. The availability can include shelf stock at different locations throughout the retail facility, including backroom binned stock of the perishable item. In the event that there is already binned perishable items in the backroom or at a different location within the retail facility, the stock inventory processing device encodes an indication with the containing bin and location information corresponding to old stock for the perishable items.

At step 214, the stock inventory processing device encodes an indication to stock the perishable items in the shipment on the sales floor when it is determined that no FIFO processing is available. In the event that there is no binned backroom stock or shelf stock available at other locations within the retail facility, the stock inventory processing device includes an auditory alert when transmitting an indication to the mobile inventory processing device. The auditory alert can be encoded and transmitted with the indication to the mobile inventory processing device. The auditory alert can be output by a speaker as a double beep, or distinct indication different from an auditory alert of a machine readable tag being scanned. Alternatively, the auditory alert can be a voice notification indicating action with the perishable item can be taken. The voice notification can be human or machine generated. The voice notification can indicated a need for stocking of the perishable items, a lack of need for stocking, an amount for restocking, and/or a location for the perishable item to be stocked. The auditory indication can be perceived by the user immediately after the scan of the machine readable tag. The auditory alert can prompt the user of the mobile inventory processing device to transfer the perishable items to follow instructions rendered on the display of the mobile inventory processing device, e.g., instructions to move the perishable items to the shelf stock on the sales floor. Alternatively haptic feedback can produce a vibration of the mobile inventory processing device to notify the user.

At step 216, the stock inventory processing device determines whether to retrieve old stock if FIFO processing is needed. In the event that there is already binned perishable items in the backroom, the stock inventory processing device encodes an indication with the containing bin and location information corresponding to old stock for the perishable items. The stock inventory processing device transmits the indication to the mobile inventory stock processing device which can decode the indication as a visual indication to be rendered on a display on the mobile inventory processing device. The display can present information related to the correct bin and the location of the bin containing the perishable items to be processed FIFO. Additionally, the display can present information regarding the location of the shelf stock and where to relocate the binned perishable items on the sales floor.

At step 218, the stock inventory processing device can provide an indication to bin the scanned perishable items in the shipment in the backroom, when old or previously binned stock of the perishable item is transferred to the shelf stock on the sales floor. Upon receiving the indication with step 216, an notification to bin the received perishable items in the shipment can additionally be encoded and transmitted to indicate to the user of the mobile inventory processing device to bin the received perishable items. Additional information including location to store the newly binned perishable items may be included as well as an indication to retrieve a new binning label from the printer. Concurrently, the stock inventory processing device can transmit an instruction for printing a new label to the printer.

At step 220, once the old previously binned stock has been retrieved and the received perishable items in the shipment has been binned, the old previously binned stock can be transferred from to the shelf stock on the sales floor.

Figure 3:
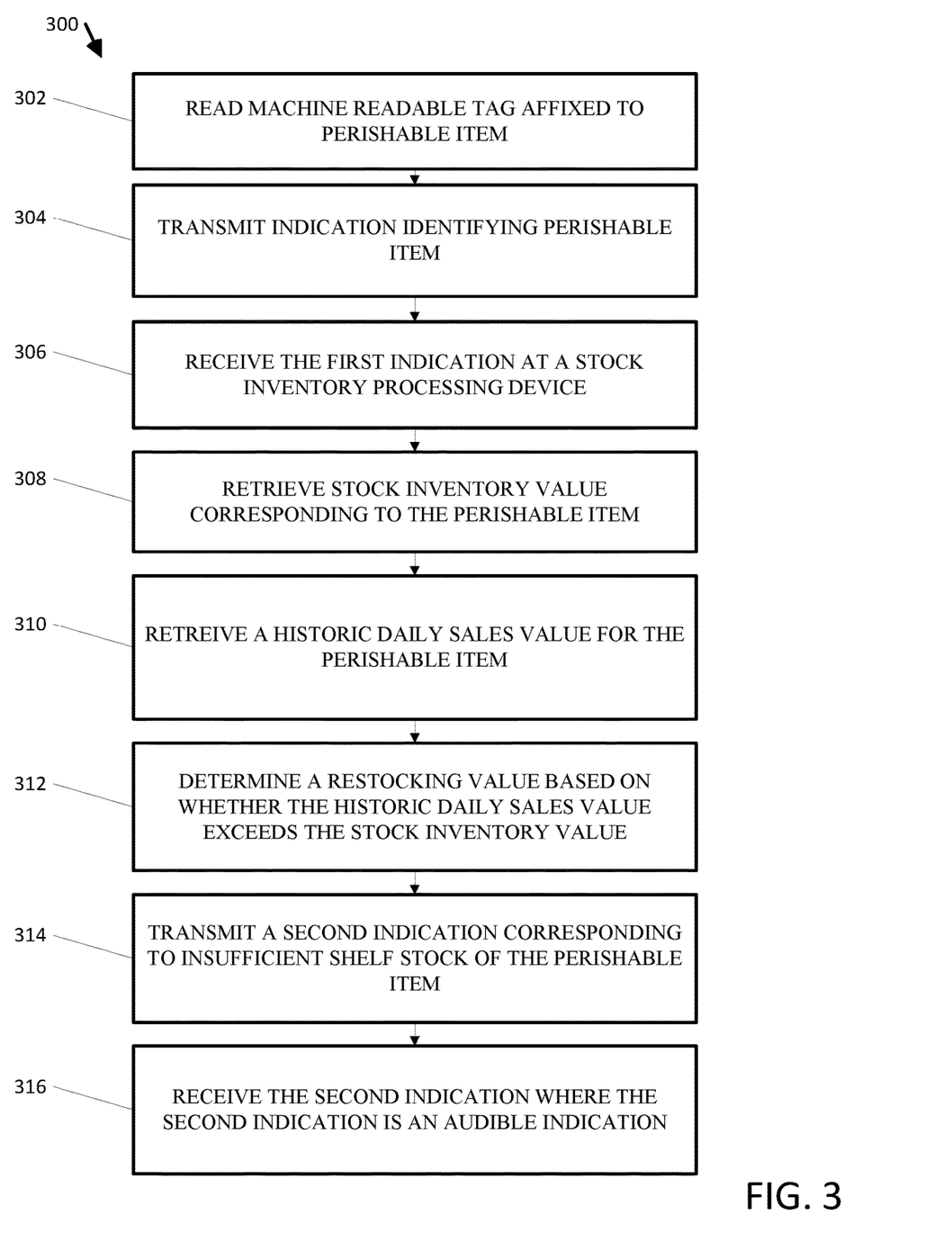
FIG. 3 is a flow diagram illustrating a process for dynamic perishable item replenishment in a retail facility according to an exemplary embodiment.

FIG. 3 is a flow diagram illustrating a process for dynamic perishable item replenishment in a retail facility according to an exemplary embodiment.

At step 302, the mobile inventory processing device reads a machine readable tag affixed to a perishable item. As discussed above, the machine readable tag can include but is not limited to a UPC barcode, QR code, NFC tag, or Bluetooth LE beacon or tag. The reader includes but is not limited to a sensor capable of reading the aforementioned machine readable tags.

At step 304, the mobile inventory processing device transmits an indication identifying a perishable item. The indication corresponds to information extracted from the reading of the machine readable tag. The mobile inventory processing device encodes the information as a digital indication and transmits that indication over a network 112 to the stock information processing device.

At step 306, the stock inventory processing device receives the first indication. The stock inventory processing device utilizes listener objects to bound to ports of the network 112 for the receipt of indications from one or more mobile inventory processing devices. The stock inventory processing device can process the indications in a queue where first received is first processed. Alternatively, or in addition, priorities based on the originating mobile inventory processing device can provide order in processing.

At step 308, the stock inventory processing device receives a stock inventory value corresponding to the perishable item from the database. The stock inventory processing device builds a database query based on the received indication corresponding to the perishable item. The database query requests available stock on the sales from the one or more databases 112A, 112B for the perishable item.

At step 310, the stock inventory processing device receives a historic daily sales value for the perishable item from the database. A second query can include a request fro the historic daily sales value for the perishable item. As discussed, the historic daily sales value can be a dynamic value, calculated periodically by the stock inventory processing device. Alternatively some database implementations allow for the automatic updating of values based on events (e.g. table updates) where the databases 112A, 112B can update the historic daily sales value.

At step 312, the stock inventory processing device determines a restocking value based on whether the historic daily sales value exceeds the stock inventory value. Additionally, the stock inventory processing device can retrieve from the databases 112A, 112B, a location of stock of the perishable item, and transmit the location of the corresponding stock.

The database 112A, 112B can be a relational database where tables have interrelated fields tying stock table to a location table.

At step 314, the stock inventory processing device, transmits a second indication corresponding to insufficient shelf stock of the perishable item. Upon the determination of insufficient stock, the stock inventory processing device notifies a user of the mobile inventory processing device of the stock deficiency through a data transmission.

At step 316, the mobile inventory processing device, receives the seconding indication where the second indication is an audible indication. The audible indication can be output by the mobile inventory processing device as a double beep or another distinct sound, such as a voice notification, to alert the user of a stock outage on the sales floor, thereby indicating that the just scanned item needs to be moved to the sales floor. Alternatively, a vibration from the haptic feedback device 132 can provide notification to the user of the mobile inventory processing device.

Figure 4:
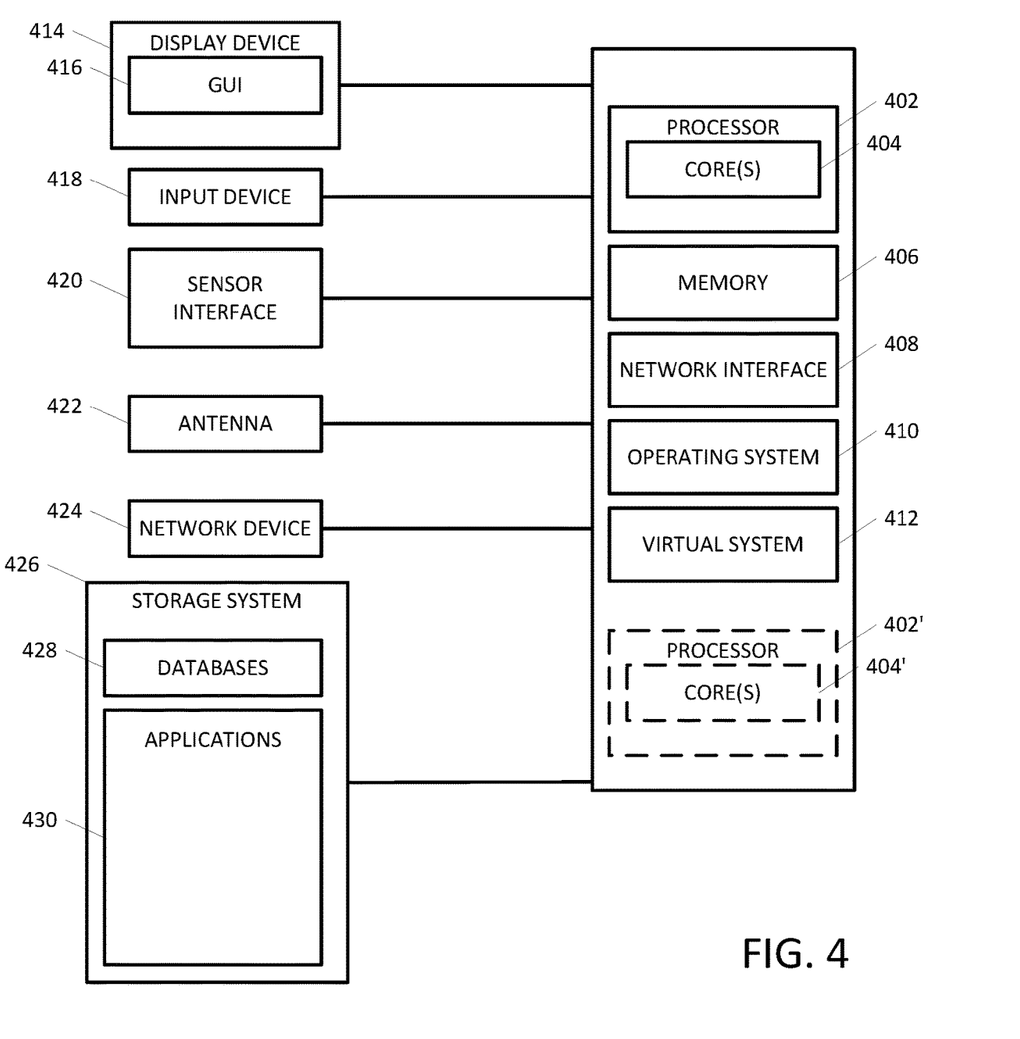
FIG. 4 depicts a block diagram an exemplary computing device in accordance with an exemplary embodiment.

FIG. 4 is a block diagram of an example computing device for implementing exemplary embodiments of the present disclosure. Embodiments of the computing device 400 can implement embodiments of the system for dynamic perishable item replenishment in a retail facility. For example, the computing device can be embodied as a portion of the mobile inventory processing device, stock inventory processing device, and the printing device. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' may each be a single core processor or multiple core (404 and 404') processor. Either or both of processor 402 and processor(s) 402' may be configured to execute one or more of the instructions described in connection with computing device 400.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof. The computing device 400 can receive data from input/output devices. A user may interact with the computing device 400 through a visual display device 414, such as a computer monitor, which may display one or more graphical user interfaces 416, sensor interface 420 and a input device 418.

The computing device 400 may also include one or more storage devices 426, such as a hard-drive, CD-ROM, or other computer readable media, for storing data and computer-readable instructions and/or software that implement exemplary embodiments of the present disclosure (e.g., GUI 118). For example, exemplary storage device 426 can include one or more databases 428 for storing information associated sensor reading and perishable item stock levels. The databases 428 may be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 may be run in native mode or emulated mode. In an exemplary embodiment, the operating system 410 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A system for dynamic replenishment in a facility comprising:
   a mobile inventory processing device, wherein the mobile inventory processing device comprises an electronic reader configured to read machine-readable codes, and a notification output device, the mobile inventory processing device configured to:
      electronically read a machine readable code forming a product tag affixed to packaging of a perishable item via the electronic reader upon receipt of a shipment of the perishable item, the machine readable code encoding an identification of the perishable item;
      transmit, to a stock inventory processing device, a first indication identifying the perishable item associated with the received shipment based on the machine readable code forming product tag;
      receive, from the stock inventory processing device, a second indication of an insufficient shelf stock in the facility corresponding to the perishable item, wherein the second indication comprises a notification indication;
   the stock inventory processing device, configured to:
      receive from the mobile inventory processing device, the first indication identifying the perishable item associated with the received shipment;
      retrieve, from a database, a real time shelf stock inventory value corresponding to the perishable item identified in the first indication;
      retrieve, from the database, a historic daily sales value corresponding to the perishable item;
      determine a restocking value based on whether the historic daily sales value exceeds the real time shelf stock inventory value;
      transmit, to the mobile inventory processing device, the second indication, wherein the second indication corresponds to the insufficient shelf stock in the facility associated with the perishable item;
      determine that there is an existing stock of the perishable item in the facility, wherein the existing stock of the perishable item is not the shelf stock or the received shipment;
      retrieve, from the database, a location of the existing stock of the perishable item in the facility;
      transmit, to the mobile inventory processing device, a third indication corresponding to the location of the existing stock in the facility and an instruction to transfer the existing stock to a retail area of the facility; and
      transmit, to the mobile inventory processing device, a fourth indication corresponding to an instruction to store the perishable item in the received shipment in a storage area of the facility.

2. The system of claim 1, wherein the notification output device is one selected from a group of an auditory output device and a haptic feedback device.

3. The system of claim 2, wherein the auditory output device is a speaker, the second indication comprises an audible indication, and the audible indication comprises a double beep.

4. The system of claim 1, wherein the mobile inventory processing device further comprises a display device configured to display the location of the existing stock of the perishable item.

5. The system of claim 1, wherein the real time shelf stock inventory value is based at least in part on an aggregate of point of sale transactions for the perishable item.

6. The system of claim 1, wherein the machine readable code further encodes historical location information associated with the shipment of the perishable item.

7. A method for dynamic replenishment in a facility comprising:
   electronically reading, by a mobile inventory processing device comprising an electronic reader and a notification output device, a machine readable code forming a product tag affixed to packaging of a perishable item upon receipt of a shipment of the perishable item, the machine readable code encoding an identification of the perishable item wherein the mobile inventory processing device comprises one or more sensors, and a notification output device;
   transmitting, by the mobile inventory processing device to a stock inventory processing device, a first indication identifying the perishable item associated with the received shipment based on the machine readable code forming the product tag;
   receiving, by the stock inventory processing device from the mobile inventory processing device, the first indication identifying the perishable item associated with the received shipment;
   retrieving, by the stock inventory processing device from a database, a real time shelf stock inventory value corresponding to the perishable item identified in the first indication;
   retrieving, by the stock inventory processing device from the database, a historic daily sales value corresponding to the perishable item;
   determining, by the stock inventory processing device, a restocking value based on whether the historic daily sales value exceeds the real time shelf stock inventory value;
   transmitting, by the stock inventory processing device to the mobile inventory processing device, a second indication, wherein the second indication corresponds to an insufficient shelf stock in the facility associated with the perishable item;
   receiving, by the mobile inventory device from the stock inventory processing device, the second indication corresponding to the insufficient shelf stock in the facility associated with the perishable item, wherein the second indication comprises a notification indication;
   determining, by the stock inventory processing device, that there is an existing stock of the perishable item in the facility, wherein the existing stock of the perishable item is not the shelf stock or the received shipment;
   retrieving, by the stock inventory processing device from the database, a location of the existing stock of the perishable item in the facility;
   transmitting, by the stock inventory processing device to the mobile inventory processing device, a third indication corresponding to the location of the existing stock in the facility and an instruction to transfer the existing stock to a retail area of the facility; and
   transmitting, by the stock inventory processing device to the mobile inventory processing device, a fourth indication corresponding to an instruction to store the perishable item in the received shipment in a storage area of the facility.

8. The method of claim 7, wherein the notification output device is one selected from a group of an auditory output device and a haptic feedback device.

9. The method of claim 8, wherein the auditory output device is a speaker, the second indication comprises an audible indication, and the audible indication comprises a double beep.

10. The method of claim 7, wherein the mobile computing device further comprises a display device configured to display the location of the existing stock of the perishable item.

11. The method of claim 7, wherein the real time shelf stock inventory value is based at least in part on an aggregate of point of sale transactions for the perishable item.

12. The method of claim 7, wherein the machine readable code further encodes historical location information associated with the shipment of the perishable item.

13. A non-transitory computer readable medium for dynamic replenishment in a facility, having stored thereon, instructions that when executed in a computing system, cause the computing system to perform operations comprising:
   electronically reading, by a mobile inventory processing device comprising an electronic reader and a notification output device, a machine readable code forming a product tag affixed to packaging of a perishable item upon receipt of a shipment the perishable item, the machine readable code encoding an identification of the perishable item;
   transmitting a first indication, to a stock inventory processing device, the first indication identifying the perishable item associated with the received shipment based on the machine readable code forming the product tag;
   receiving the first indication identifying the perishable item associated with the received shipment from the mobile inventory processing device;
   retrieving a real time shelf stock inventory value corresponding to the perishable item identified in the first indication;
   retrieving, from a database, a historic daily sales value corresponding to the perishable item;
   determining a restocking value based on whether the historic daily sales value exceeds the real time shelf stock inventory value;
   transmitting a second indication to the mobile inventory processing device, wherein the second indication corresponds to an insufficient shelf stock associated with the perishable item in the facility;
   receiving the second indication of the insufficient shelf stock in the facility corresponding to the perishable item, wherein the second indication comprises a notification indication;
   determining that there is an existing stock of the perishable item in the facility, wherein the existing stock of the perishable item is not the shelf stock or the received shipment;
   retrieving, from the database, a location of the existing stock of the perishable item in the facility;
   transmitting a third indication to the mobile inventory processing device, wherein the third indication corresponds to the location of the existing stock in the facility and an instruction to transfer the existing stock to a retail area of the facility; and
   transmitting a fourth indication to the mobile inventory processing device, wherein the fourth indication corresponds to an instruction to store the perishable item in the received shipment in a storage area of the facility.

14. The medium of claim 13, wherein the notification output device is one selected from a group of an auditory output device and a haptic feedback device.

15. The medium of claim 14, wherein the auditory output device is a speaker, the second indication comprises an audible indication, and the audible indication comprises a double beep.

16. The medium of claim 13, wherein the mobile inventory processing device further comprises a display device configured to display the location of the existing stock of the perishable item.

17. The medium of claim 13, wherein the machine readable code further encodes historical location information associated with the shipment of the perishable item.

* * * * *